(12) United States Patent
Naik (10) Patent No.: US 12,185,198 B2
(45) Date of Patent: *Dec. 31, 2024

(54) CONFIGURATION ENHANCEMENTS ON ACCESS POINT NAME (APN) OR DATA NETWORK NAME (DNN) SELECTION IN USER EQUIPMENT (UE)

(71) Applicant: MEDIATEK INC., Hsinchu (TW)

(72) Inventor: Rohit Naik, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,648

(22) Filed: Feb. 6, 2024

(65) Prior Publication Data

US 2024/0214780 A1    Jun. 27, 2024

Related U.S. Application Data

(63) Continuation of application No. 17/392,806, filed on Aug. 3, 2021, now Pat. No. 11,930,427.

(Continued)

(51) Int. Cl.
| | |
|---|---|
| *H04W 4/14* | (2009.01) |
| *H04L 65/1016* | (2022.01) |
| *H04W 76/25* | (2018.01) |
| *H04L 101/375* | (2022.01) |

(52) U.S. Cl.
CPC .......... *H04W 4/14* (2013.01); *H04L 65/1016* (2013.01); *H04W 76/25* (2018.02); *H04L 2101/375* (2022.05)

(58) Field of Classification Search
CPC ........... H04L 65/1016; H04L 2101/375; H04L 65/1069; H04W 4/14; H04W 76/25; H04W 4/12
See application file for complete search history.

(56) References Cited

U.S. PATENT DOCUMENTS

| | | | |
|---|---|---|---|
| 9,392,531 | B2 | 7/2016 | Pinheiro |
| 11,256,313 | B2 * | 2/2022 | O'Toole ................ G06F 1/30 |

(Continued)

FOREIGN PATENT DOCUMENTS

| | | |
|---|---|---|
| CN | 101730142 A | 6/2010 |
| CN | 105850184 A | 8/2016 |

(Continued)

OTHER PUBLICATIONS

Chinese language office action dated Feb. 4, 2024, issued in application No. CN 202111055811.8.

(Continued)

*Primary Examiner* — Zhensheng Zhang
(74) *Attorney, Agent, or Firm* — McClure, Qualey & Rodack, LLP (57) ABSTRACT

A Mobile communication network having a wireless transceiver, configured to perform wireless transmission and reception to and from a UE, and a controller, coupled to the wireless transceiver. The controller is configured to: send a message to the UE via the wireless transceiver, wherein the message comprises information for indicating an order and a priority of reading Access Point Name (APN) parameters or Data Network Name (DNN) parameters from a plurality of input sources, and wherein each input source comprises an APN value or a DNN value. The message comprises an IP Multimedia Subsystem (IMS) Management Object (MO), and the information is provided by an IMS configuration parameter in the IMS MO.

14 Claims, 8 Drawing Sheets

Related U.S. Application Data (60) Provisional application No. 63/089,071, filed on Oct. 8, 2020.

(56) References Cited

U.S. PATENT DOCUMENTS

| | | |
|---|---|---|
| 11,622,395 B2 | 4/2023 | Xin |
| 2015/0017966 A1 | 1/2015 | Kaura |
| 2015/0215845 A1 | 7/2015 | Pinheiro |
| 2017/0099619 A1 | 4/2017 | Yin |
| 2017/0311241 A1 | 10/2017 | Russell |
| 2017/0374695 A1 | 12/2017 | Lau |
| 2019/0098498 A1 | 3/2019 | Badulescu |
| 2020/0186462 A1 | 6/2020 | Lucia |
| 2022/0007264 A1 | 1/2022 | Takakura |

FOREIGN PATENT DOCUMENTS

| | | |
|---|---|---|
| CN | 110431862 A | 11/2019 |
| CN | 111356184 A | 6/2020 |
| JP | 2020-088453 A | 6/2020 |
| TW | 201944843 A | 11/2019 |
| WO | 2016/107404 A1 | 7/2016 |

OTHER PUBLICATIONS

Xue, Z., et al.; "A Method of Acquiring Access Network Dynamic Information for ANDSF;" Broad Angle for Technology; Jun. 2012; pp. 1-4.

English language translation of abstract of "A Method of Acquiring Access Network Dynamic Information for ANDSF" (p. 1 of publication).

Chang, Y., et al.; "Research on the Network Integration Construction of WCDMA with WLAN;" Jan. 2013; pp. 1-5.

English language translation of abstract of "Research on the Network Integration Construction of WCDMA with WLAN" (p. 1 of publication).

Ericsson; "Access Type Report for a MA PDU session;" 3GPP TSG-CT WG3 Meeting #110e; Jun. 2020; pp. 1-45.

Chinese Language Office Action dated Mar. 3, 2022 of its corresponding Taiwan patent application.

* cited by examiner

CONFIGURATION ENHANCEMENTS ON ACCESS POINT NAME (APN) OR DATA NETWORK NAME (DNN) SELECTION IN USER EQUIPMENT (UE)

CROSS REFERENCE TO RELATED APPLICATIONS

This application is a Continuation of U.S. Ser. No. 17/392,806, filed on Aug. 3, 2021, which claims priority under 35 U.S.C. § 119 from U.S. Provisional Application No. 63/089,071, entitled "Method to select APN parameter reading source and ESM information transfer flag setting based on APN selection setting", filed on Oct. 8, 2020, the subject matter of which is incorporated herein by reference.

BACKGROUND OF THE APPLICATION

Field of the Application

The application generally relates to mobile communications, and more particularly, to configuration enhancements on Access Point Name (APN) or Data Network Name (DNN) selection in User Equipment (UE).

Description of the Related Art

In a typical mobile communication environment, a UE (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In a 4G network, a UE needs to read or receive the Access Point Name (APN) parameter and use the APN value to get attached to a specific APN to get access to the core network for data services, such as public network service (i.e., Internet service), private network service, and Multimedia Messaging Service (MMS), etc. Similarly, in a 5G network, a UE needs to read or receive the Data Network Name (DNN) parameter and use the DNN value to get attached to a specific DNN to get access to the core network for data services. Specifically, a UE making a data connection must be configured with an APN to present to the network, and the network will then examine this identifier to determine what type of network connection should be created, for example: which IP address should be assigned to the UE, which security methods should be used, and how or if, the UE should be connected to some private network. However, a UE may get the APN/DNN parameter from multiple input sources, and the APN/DNN values provided by these different input sources may differ. For example, input source 1 may indicate an APN/DNN value=A, input source 2 may indicate an APN/DNN value=B, and input source 3 may indicate an APN/DNN value=C. As a result, the UE's behaviors related to APN/DNN selection may be indeterminate, and operation errors may occur (e.g., the UE may not be able to obtain desired data service due to using the APN/DNN parameter from the wrong input source).

A solution is sought.

BRIEF SUMMARY OF THE APPLICATION

The present application proposes to introduce a new configuration parameter which allows the mobile communication network to indicate to the UE the order and priority of reading APN/DNN parameters from multiple input sources. Advantageously, the UE can use this new configuration parameter which can guide it to select the correct input source to read the APN/DNN parameter, and the mobile communication network is able to modify the APN/DNN selection in the UE based on network deployment and/or specific network policy.

In one aspect of the application, a UE comprising a wireless transceiver and a controller is provided. The wireless transceiver is configured to perform wireless transmission and reception to and from a mobile communication network. The controller is coupled to the wireless transceiver, and configured to: receive a message from the mobile communication network via the wireless transceiver, wherein the message comprises information on an input source of an Access Point Name (APN) value or a Data Network Name (DNN) value; and based on the information, use the APN value or the DNN value to request establishment of a Packet Data Network (PDN) connection or a Protocol Data Unit (PDU) session with the mobile communication network via the wireless transceiver.

In another aspect of the application, a method is provided. The method comprises the following steps: receiving a message from a mobile communication network by a UE, wherein the message comprises information on an input source of an Access Point Name (APN) value or a Data Network Name (DNN) value; and based on the information, using the APN value or the DNN value to request establishment of a Packet Data Network (PDN) connection or a Protocol Data Unit (PDU) session with the mobile communication network.

In one embodiment, the message comprises an IP Multimedia Subsystem (IMS) Management Object (MO), and the information is provided by an IMS configuration parameter in the IMS MO.

In one embodiment, the message is received via Open Mobile Alliance-Device Management (OMA-DM) signaling, HyperText Transfer Protocol (HTTP) signaling, Non-Access Stratum (NAS) signaling, or AS signaling.

In one embodiment, the APN value or the DNN value is provided by a Universal Integrated Circuit Card (UICC) in the UE, when the IMS configuration parameter is set to a first value. For example, the APN value or the DNN value is provided by an Elementary File (EF) for APN Control List (ACL) in the UICC.

In another embodiment, the APN value or the DNN value is provided by the mobile communication network, when the IMS configuration parameter is set to a second value. For example, the APN value or the DNN value is provided by a Radio Resource Control (RRC) response message or a Short Message Service (SMS) message sent by the mobile communication network.

In another embodiment, the APN value or the DNN value is provided by user via UE settings menu or any other method, when the IMS configuration parameter is set to a third value.

In one embodiment, the using of the APN value or the DNN value based on the information is performed in response to a boot-up of the UE or in response to a flight mode of the UE being turned on and off.

In one embodiment, the APN value or the DNN value is associated with an extensible Markup Language (XML) Configuration Access Protocol (XCAP) APN or DNN, a Multimedia Messaging Service (MMS) APN or DNN, or an IMS APN or DNN.

Other aspects and features of the present application will become apparent to those with ordinary skill in the art upon review of the following descriptions of specific embodiments of the UEs and methods for configuration enhancements on APN/DNN selection.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
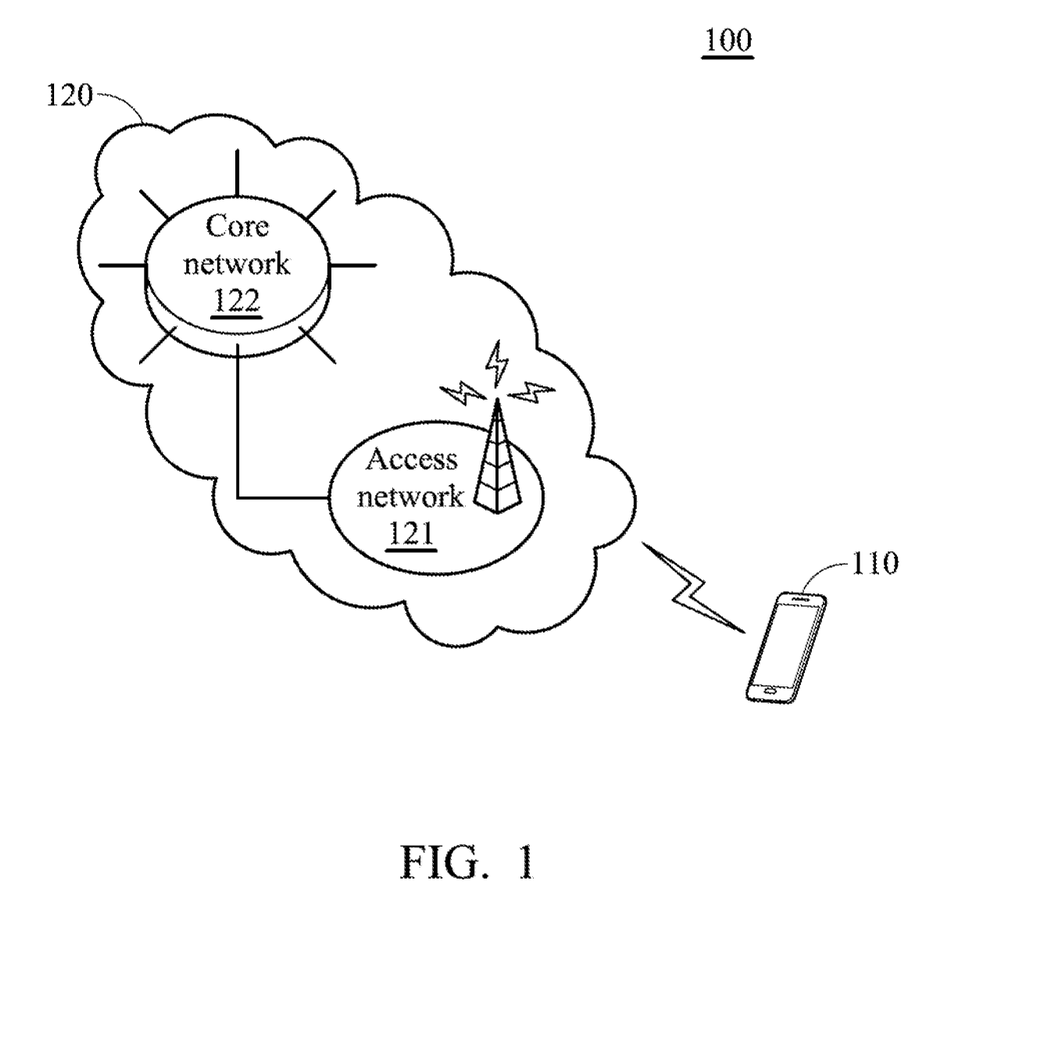
FIG. 1 is a block diagram of a mobile communication environment according to an embodiment of the application.

FIG. 1 is a block diagram of a mobile communication environment according to an embodiment of the application.

As shown in FIG. 1, the mobile communication environment 100 includes a UE 110 and a mobile communication network 120.

The UE 110 may be a feature phone, a smartphone, a panel Personal Computer (PC), a laptop computer, a Machine Type Communication (MTC) device, or any mobile communication device supporting the RAT(s) utilized by the mobile communication network 120. The UE 110 may connect to the mobile communication network 120 to obtain mobile services (e.g., voice and/or data services).

The mobile communication network 120 may include an access network 121 and a core network 122. The access network 121 is responsible for processing radio signals, terminating radio protocols, and connecting the UE 110 with the core network 122, while the core network 122 is responsible for performing mobility management, network-side authentication, and interfaces with public/external networks, such as the Internet and/or an IP Multimedia Subsystem (IMS). For example, an IMS may serve as a service delivery platform which is consisting of various network functions for providing Internet Protocol (IP) multimedia services (e.g., Voice over LTE (VoLTE)/Voice over NR (VoNR), Video over LTE (ViLTE)/Video over NR (ViNR), Short Message Service (SMS), Multimedia Messaging Service (MMS), and extensible Markup Language (XML) Configuration Access Protocol (XCAP), etc.) to the UE 110 over the mobile communication network 120.

In one embodiment, if the mobile communication network 120 is a 4G network (e.g., an LTE/LTE-A/TD-LTE network), the access network 121 may be an Evolved-Universal Terrestrial Radio Access Network (E-UTRAN) and the core network 122 may be an Evolved Packet Core (EPC). The E-UTRAN may include at least an evolved NodeB (eNB) (e.g., a macro eNB, femto eNB, or pico eNB). The EPC may include a Home Subscriber Server (HSS), a Mobility Management Entity (MME), a Serving Gateway (S-GW), and a Packet Data Network Gateway (PDN-GW or P-GW).

In one embodiment, if the mobile communication network 120 is a standalone 5G network (e.g., an NR network), the access network 121 may be a Next Generation Radio Access Network (NG-RAN) and the core network 122 may be a Next Generation Core Network (NG-CN). The NG-RAN may include one or more gNBs. Each gNB may further include one or more Transmission Reception Points (TRPs), and each gNB or TRP may be referred to as a 5G cellular station. Some gNB functions may be distributed across different TRPs, while others may be centralized, leaving the flexibility and scope of specific deployments to fulfill the requirements for specific cases. The NG-CN may support various network functions, including an Access and Mobility Management Function (AMF), a Session Management Function (SMF), a User Plane Function (UPF), a Policy Control Function (PCF), an Application Function (AF), and an Authentication Server Function (AUSF), wherein each network function may be implemented as a network element on dedicated hardware, or as a software instance running on dedicated hardware, or as a virtualized function instantiated on an appropriate platform, e.g., a cloud infrastructure.

In another embodiment, the mobile communication network 120 is a non-standalone (NSA) 5G network (i.e., an LTE-NR interworking system), in which the core network 122 is still a 4G core (e.g., an EPC), and the access network 121 includes both an E-UTRAN and a NG-RAN. If the UE 110 supports EUTRA-NR Dual Connectivity (EN-DC), the UE 110 may communicate with both an eNB and a gNB in the radio aspect, but all those communications (i.e., signaling and/or data) are going through an EPC. Particularly, the eNB serves as the Master Node (MN), while the gNB serves as the Secondary Node (SN). In case of data plane communication, each of the MN and the SN has direct interface with the EPC (e.g., the S-GW), while in case of control plane communication, only the SN has direct interface with the EPC (e.g., the MME).

In accordance with one novel aspect, the UE 110 is allowed to receive from the mobile communication network 120 a new configuration parameter dedicated for indicating the order and priority of reading APN/DNN parameters from multiple input sources. The multiple input sources may include: (1) the APN/DNN values provided by the Universal Integrated Circuit Card (UICC) in the UE 110 (e.g., in the Elementary File (EF) for APN Control List (ACL) (or referred to as $EF_{ACL}$) in the UICC); (2) the APN/DNN values provided by the mobile communication network 120 (e.g., via an RRC response message, such as the Activate Default EPS Bearer Context Request message for 4G, or the PDU Session Establishment Accept message for 5G; or via a Short Message Service (SMS) message); and (3) the APN/DNN values provided by user via UE settings menu or any other method. The new configuration parameter may be an IMS configuration parameter delivered in an IMS Management Object (MO). When the IMS configuration parameter is set to a first value (e.g., 0), it could mean that the UE 110 should use the APN values provided by the UICC. When the IMS configuration parameter is set to a second value (e.g., 1), it could mean that the UE 110 should use the APN values provided by the mobile communication network 120. When the IMS configuration parameter is set to a third value (e.g., 2), it could mean that the UE 110 should use the APN values provided by user via UE settings menu or any other method (e.g., use the default value stored in phone image).

Figure 2:
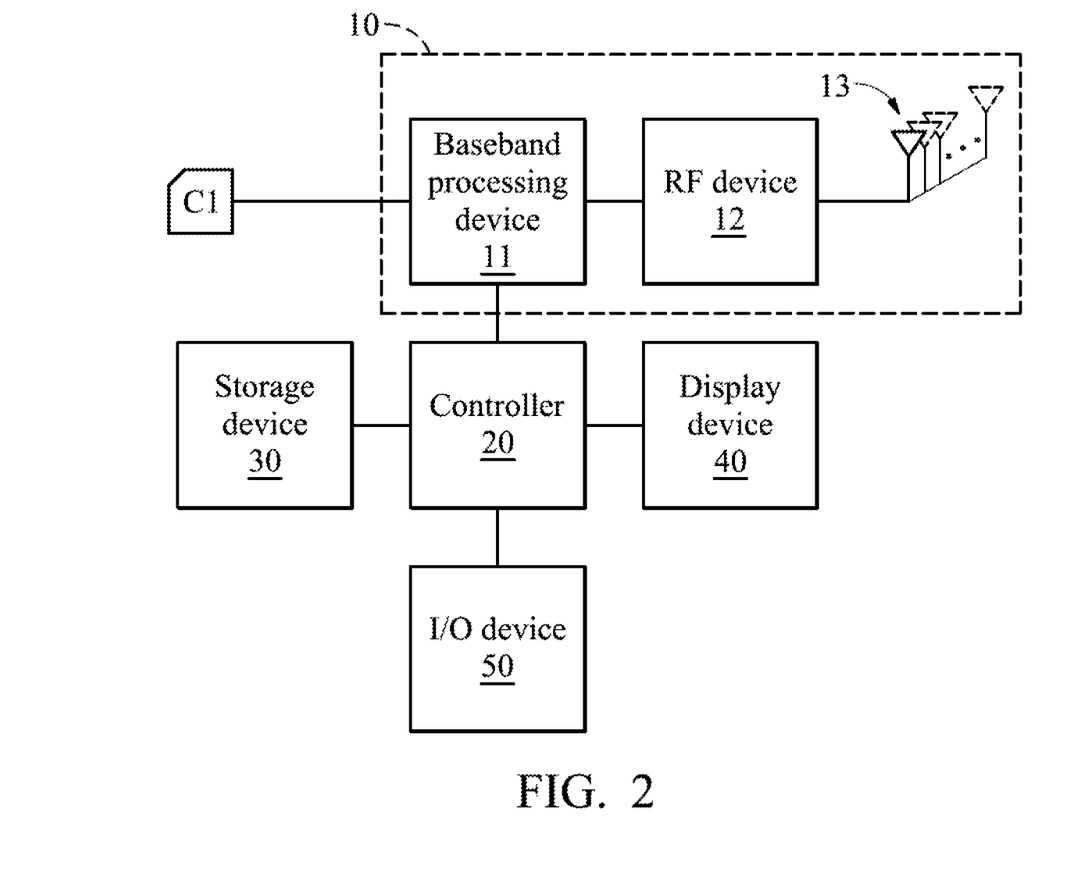
FIG. 2 is a block diagram illustrating a UE according to an embodiment of the application.

FIG. 2 is a block diagram illustrating a UE according to an embodiment of the application.

As shown in FIG. 2, a UE (e.g., the UE 110) may include a wireless transceiver 10, a controller 20, a storage device 30, a display device 40, and an Input/Output (I/O) device 50.

The wireless transceiver 10 is configured to perform wireless transmission and reception to and from other the mobile communication network 120 using a UICC (denoted as C1 in FIG. 2). The UICC may be a Subscriber Identity Module (SIM) card or a Universal SIM (USIM) card, depending on the RAT utilized by the mobile communication network 120. Alternatively, the UICC may be a programmable SIM/USIM (e.g., eSIM/eUSIM) that is embedded directly into the UE 110.

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between the UICC and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz~300 GHz for mm Wave) utilized in the 5G NR technology, or may be 900 MHz, 2100 MHz, or 2.6 GHz utilized in LTE/LTE-A/TD-LTE technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the mobile communication network 120, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 to perform the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application. For example, the communication protocols may include a Session Initiation Protocol (SIP), and a 4G LTE or 5G NR protocol stack which includes a Non-Access-Stratum (NAS) layer to communicate with an AMF/SMF/MME entity connecting to the core network 122, a Radio Resource Control (RRC) layer for high layer configuration and control, a Packet Data Convergence Protocol/Radio Link Control (PDCP/RLC) layer, a Media Access Control (MAC) layer, and a Physical (PHY) layer.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, a UE may include more components, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, the UE may not include the display device 40 and/or the I/O device 50.

Figure 3:
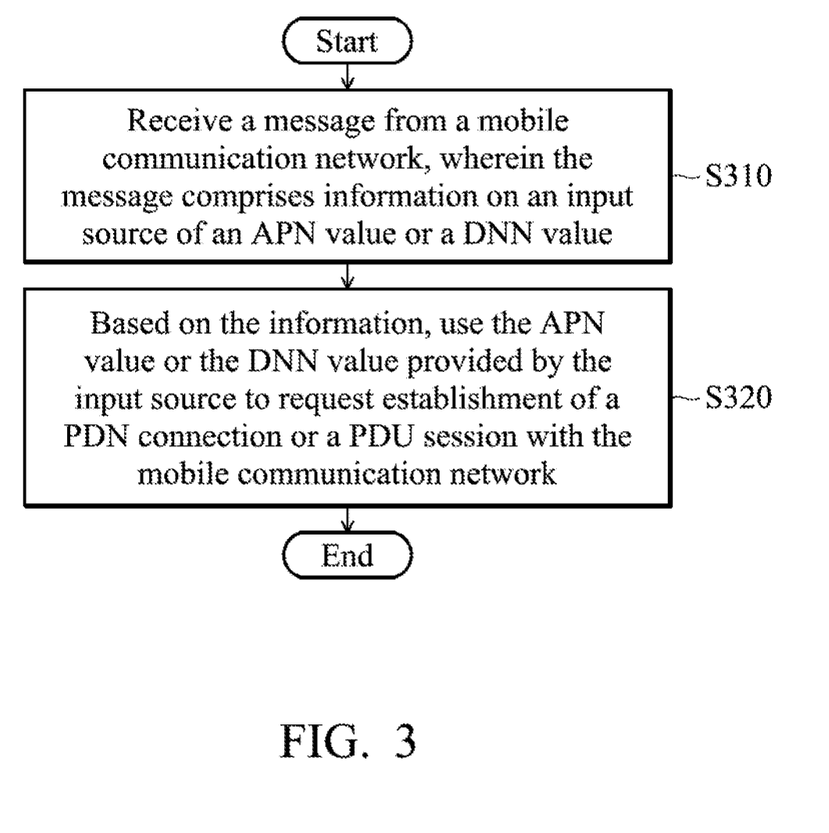
FIG. 3 is a flow chart illustrating the method for configuration enhancements on APN/DNN selection according to an embodiment of the application.

FIG. 3 is a flow chart illustrating the method for configuration enhancements on APN/DNN selection according to an embodiment of the application.

In this embodiment, the method for configuration enhancements on APN/DNN selection is applied to and executed by a UE (e.g., the UE 110).

In step S310, the UE receives a message from a mobile communication network, wherein the message comprises information on an input source of an APN value or a DNN value.

Figure 4A:
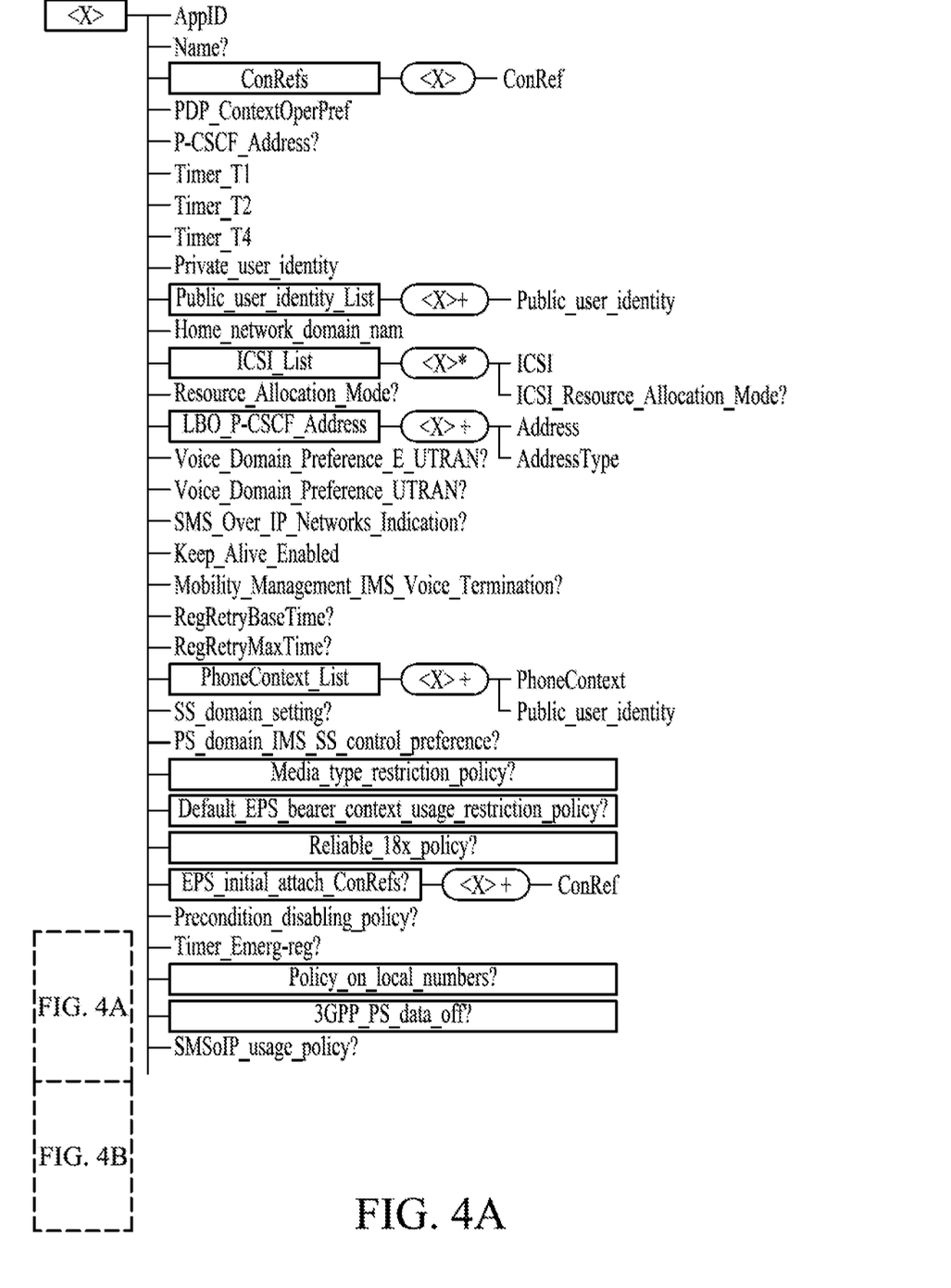
FIGS. 4A and 4B show a schematic diagram illustrating an IMS MO with the IMS configuration parameter according to an embodiment of the application.
Figure 4B:
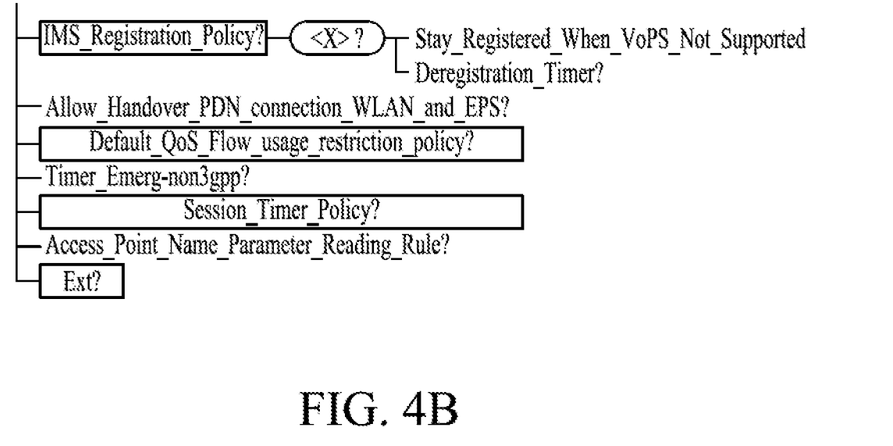

In one example, the message may include an IMS MO, and the information is provided by an IMS configuration parameter in the IMS MO. FIGS. 4A and 4B show a schematic diagram illustrating an IMS MO with the IMS configuration parameter according to an embodiment of the application. As shown in FIG. 4B, the IMS configuration parameter may refer to the optional leaf node called "Access_Point_Name_Parameter_Reading_Rule", that defines which input source should the UE use to read the APN parameters. This leaf node may configured with the following attributes: (1) Occurrence: ZeroOrOne; (2) Format: int; (3) Access Types: Get, Replace; (4) Values: 0, 1, 2. Specifically, value=0 indicates that the UE should use APN values provided by the UICC as per 3GPP TS 31.102 rules; value=1 indicates that the UE should use APN values provided by network; and value=2 indicates that the UE should use the APN values provided by user via UE settings menu or any other method.

In one example, the message may be received via Open Mobile Alliance-Device Management (OMA-DM) signaling, HyperText Transfer Protocol (HTTP) signaling, Non-Access Stratum (NAS) signaling, or AS signaling.

In step S320, based on the information, the UE uses the APN value or the DNN value provided by the input source to request establishment of a Packet Data Network (PDN) connection or a Protocol Data Unit (PDU) session with the mobile communication network.

In one example, step S320 may be performed in response to a boot-up of the UE or in response to a flight mode of the UE being turned on and off.

In one example, the APN/DNN value is associated with an XCAP APN/DNN, an MMS APN/DNN, or an IMS APN/DNN.

In one example, if the mobile communication network is a 4G network, the UE may set the APN parameter in the PDN Connectivity Request message which is used to request establishment of a PDN connection. In another example, if the mobile communication network is a 5G network, the UE may set the DNN parameter in the PDU Session Establishment Request message which is used to request establishment of a PDU session.

After the PDN connection or the PDU session is established successfully, the UE may obtain data services (e.g., XCAP, MMS, and/or IMS) from the mobile communication network.

Figure 5:
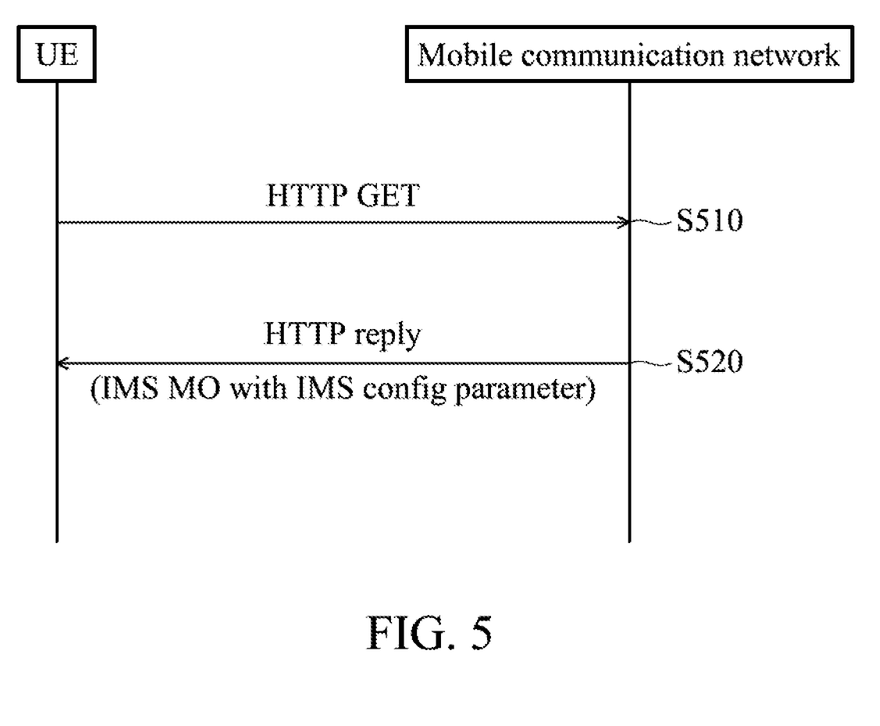
FIG. 5 is a message sequence chart illustrating delivery of the message including an IMS MO with the IMS configuration parameter according to an embodiment of the application.

FIG. 5 is a message sequence chart illustrating delivery of the message including an IMS MO with the IMS configuration parameter according to an embodiment of the application.

In this embodiment, the message including an IMS MO with the IMS configuration parameter is delivered using the HTTP.

In step S510, the UE sends a HTTP GET message to request the IMS MO with the IMS configuration parameter.

In step S520, the mobile communication network sends a HTTP reply message including the IMS MO with the IMS configuration parameter to the UE in response to receiving the HTTP GET message.

In one example, the HTTP reply message may be a 200 OK message, and the IMS MO with the IMS configuration parameter may be presented in an XML format in the HTTP reply message.

Figure 6:
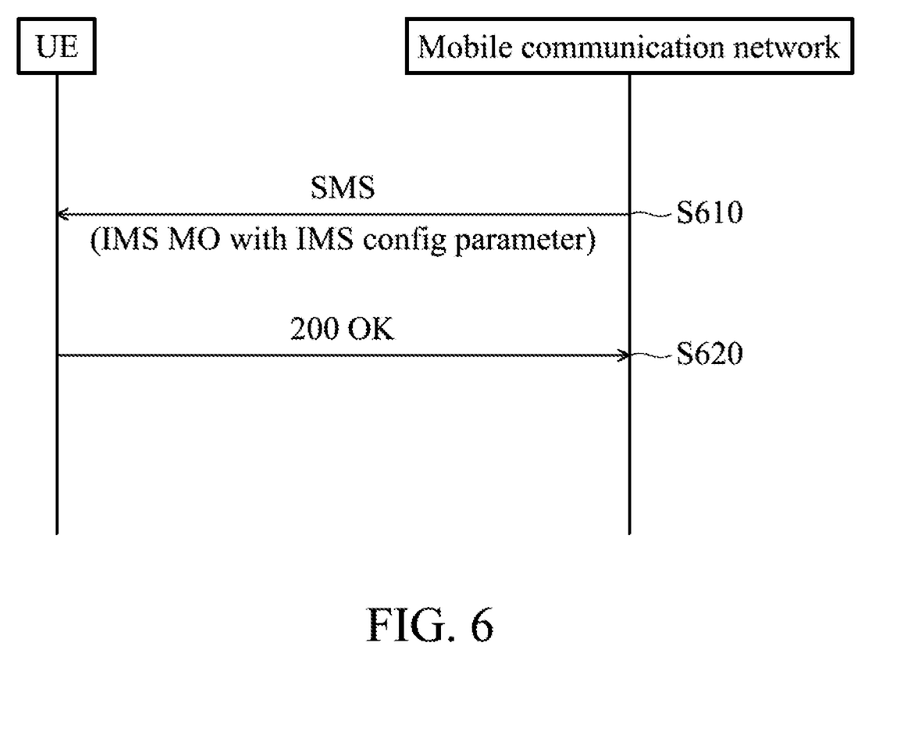
FIG. 6 is a message sequence chart illustrating delivery of the message including an IMS MO with the IMS configuration parameter according to another embodiment of the application.

FIG. 6 is a message sequence chart illustrating delivery of the message including an IMS MO with the IMS configuration parameter according to another embodiment of the application.

In this embodiment, the message including an IMS MO with the IMS configuration parameter is delivered using the SMS.

In step S610, the mobile communication network sends an SMS message including the IMS MO with the IMS configuration parameter to the UE. In one example, the IMS MO with the IMS configuration parameter may be presented in an XML format in the SMS message.

In step S620, the UE replies to the mobile communication network with a 200 OK message to acknowledge the reception of the SMS message.

Figure 7:
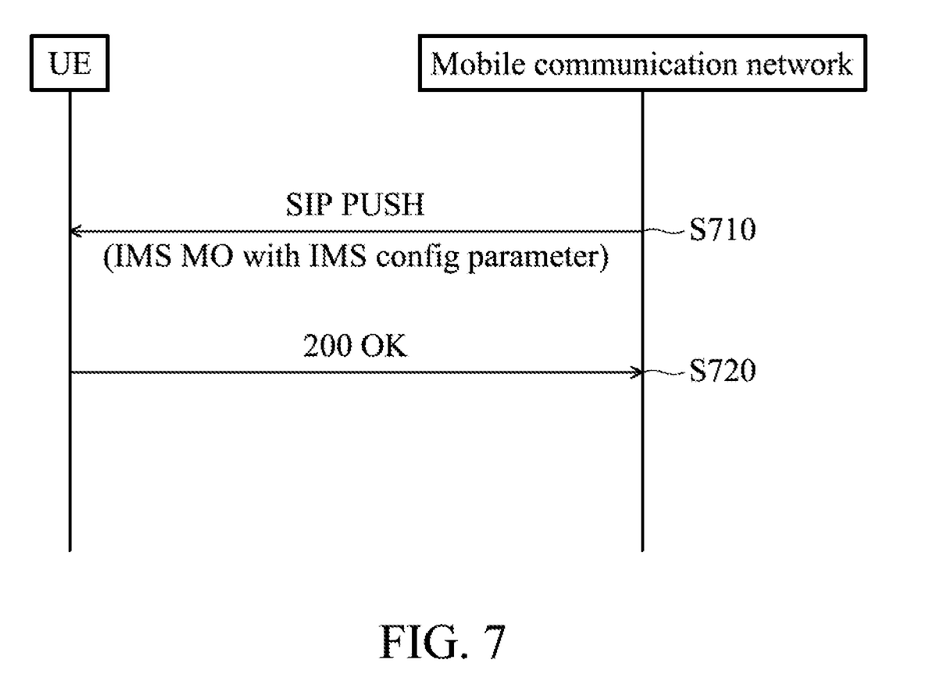
FIG. 7 is a message sequence chart illustrating delivery of the message including an IMS MO with the IMS configuration parameter according to another embodiment of the application.

FIG. 7 is a message sequence chart illustrating delivery of the message including an IMS MO with the IMS configuration parameter according to another embodiment of the application.

In this embodiment, the message including an IMS MO with the IMS configuration parameter is delivered using the Session Initiation Protocol (SIP).

In step S710, the mobile communication network sends a SIP PUSH message including the IMS MO with the IMS configuration parameter to the UE. In one example, the IMS MO with the IMS configuration parameter may be presented in an XML format in the SIP PUSH message.

In step S720, the UE replies to the mobile communication network with a 200 OK message to acknowledge the reception of the SIP PUSH message.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A Mobile communication network, comprising:
  a wireless transceiver, configured to perform wireless transmission and reception to and from a UE; and
  a controller, coupled to the wireless transceiver, and configured to:
    send a message to the UE via the wireless transceiver, wherein the message comprises information for indicating an order and a priority of reading Access Point Name (APN) parameters or Data Network Name (DNN) parameters from a plurality of input sources, and wherein each input source comprises an APN value or a DNN value; and
    wherein the message comprises an IP Multimedia Subsystem (IMS) Management Object (MO), and the information is provided by an IMS configuration parameter in the IMS MO,
    wherein the APN value or the DNN value is provided by a Universal Integrated Circuit Card (UICC) in the UE, by the mobile communication network, or by user via UE settings menu or any other method based on a value of the IMS configuration parameter in the IMS MO.

2. The Mobile communication network as claimed in claim 1, wherein the message is sent via Open Mobile Alliance-Device Management (OMA-DM) signaling, HyperText Transfer Protocol (HTTP) signaling, Non-Access Stratum (NAS) signaling, or AS signaling.

3. The Mobile communication network as claimed in claim 1, wherein the APN value or the DNN value is provided by the UICC in the UE, when the IMS configuration parameter is set to a first value.

4. The Mobile communication network as claimed in claim 3, wherein the APN value or the DNN value is provided by an Elementary File (EF) for APN Control List (ACL) in the UICC.

5. The Mobile communication network as claimed in claim 1, wherein the APN value or the DNN value is provided by the mobile communication network, when the IMS configuration parameter is set to a second value.

6. The Mobile communication network as claimed in claim 5, wherein the APN value or the DNN value is provided by a Radio Resource Control (RRC) response message or a Short Message Service (SMS) message sent by the mobile communication network.

7. The Mobile communication network as claimed in claim 1, wherein the APN value or the DNN value is associated with an extensible Markup Language (XML) Configuration Access Protocol (XCAP) APN or DNN, a Multimedia Messaging Service (MMS) APN or DNN, or an IMS APN or DNN.

8. A method, comprising:
  sending a message from a mobile communication network to a User Equipment (UE), wherein the message comprises information for indicating an order and a priority of reading Access Point Name (APN) parameters or Data Network Name (DNN) parameters from a plurality of input sources, and wherein each input source comprises an APN value or a DNN value; and
  receiving a request establishment of a Packet Data Network (PDN) connection or a Protocol Data Unit (PDU) session by using the APN value or the DNN value based on the information from the UE,
  wherein the message comprises an IP Multimedia Subsystem (IMS) Management Object (MO), and the information is provided by an IMS configuration parameter in the IMS MO,
  wherein the APN value or the DNN value is provided by a Universal Integrated Circuit Card (UICC) in the UE, by the mobile communication network, or by user via UE settings menu or any other method based on a value of the IMS configuration parameter in the IMS MO.

9. The method as claimed in claim 8, wherein the message is sent via Open Mobile Alliance-Device Management (OMA-DM) signaling, HyperText Transfer Protocol (HTTP) signaling, Non-Access Stratum (NAS) signaling, or AS signaling.

10. The method as claimed in claim 8, wherein the APN value or the DNN value is provided by the UICC in the UE, when the IMS configuration parameter is set to a first value.

11. The method as claimed in claim 10, wherein the APN value or the DNN value is provided by an Elementary File (EF) for APN Control List (ACL) in the UICC.

12. The method as claimed in claim 8, wherein the APN value or the DNN value is provided by the mobile communication network, when the IMS configuration parameter is set to a second value.

13. The method as claimed in claim 12, wherein the APN value or the DNN value is provided by a Radio Resource Control (RRC) response message or a Short Message Service (SMS) message sent by the mobile communication network.

14. The method as claimed in claim 8, wherein the APN value or the DNN value is associated with an extensible Markup Language (XML) Configuration Access Protocol (XCAP) APN or DNN, a Multimedia Messaging Service (MMS) APN or DNN, or an IMS APN or DNN.

* * * * *